(12) United States Patent
Grigg et al.

(10) Patent No.: US 9,015,070 B2
(45) Date of Patent: Apr. 21, 2015

(54) SYSTEM FOR PRE-PROCESSING SALES RETURNS

(75) Inventors: David M. Grigg, Rock Hill, SC (US); Susan Smith Thomas, Gastonia, NC (US); Peter John Bertanzetti, Charlotte, NC (US); Matthew A. Calman, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 13/536,864

(22) Filed: Jun. 28, 2012

(65) Prior Publication Data
US 2014/0006224 A1  Jan. 2, 2014

(51) Int. Cl.
| G06Q 10/08 | (2012.01) |
| G06Q 20/12 | (2012.01) |
| G06Q 20/32 | (2012.01) |
| G06Q 30/06 | (2012.01) |
| G06Q 30/00 | (2012.01) |
| G06Q 20/20 | (2012.01) |

(52) U.S. Cl.
CPC ............ *G06Q 10/0837* (2013.01); *G06Q 30/00* (2013.01); *G06Q 20/203* (2013.01); *G06Q 30/016* (2013.01); *G06Q 30/06* (2013.01); *G06Q 30/0601* (2013.01); *G06Q 20/12* (2013.01); *G06Q 20/204* (2013.01); *G06Q 20/3223* (2013.01); *G06Q 20/3274* (2013.01); *G06Q 20/3276* (2013.01)

(58) Field of Classification Search
CPC ... G06Q 30/06; G06Q 30/0601; G06Q 30/00; G06Q 30/016; G06Q 20/203; G06Q 10/0837
See application file for complete search history.

(56) References Cited

U.S. PATENT DOCUMENTS

| 6,536,659 B1 * | 3/2003 | Hauser et al. ................. 235/375 |
| 7,596,516 B2 | 9/2009 | Starkowsky et al. |
| 7,716,091 B2 | 5/2010 | Ross |
| 8,311,895 B1 * | 11/2012 | Murugan et al. ............. 705/26.1 |
| 2001/0029483 A1 * | 10/2001 | Schultz et al. ................. 705/39 |
| 2002/0032612 A1 * | 3/2002 | Williams et al. ............... 705/26 |
| 2003/0225625 A1 * | 12/2003 | Chew et al. ..................... 705/24 |
| 2005/0165651 A1 | 7/2005 | Mohan |
| 2005/0246234 A1 | 11/2005 | Munyon |
| 2008/0195517 A1 | 8/2008 | Minerley |

(Continued)

FOREIGN PATENT DOCUMENTS

CN  101599151  12/2009

OTHER PUBLICATIONS

Davidson, Jim "e-Receipts: What's Not in Your Wallet?"; http://bronto.com/blog/email-marketing-strategy/electronic-receipts-erecipts-email-marketing; Feb. 14, 2012.

*Primary Examiner* — Asfand Sheikh
(74) *Attorney, Agent, or Firm* — Michael A. Springs; Moore & Van Allen PLLC; Tracea L. Rice

(57) ABSTRACT

Systems, methods, and computer program products are provided for pre-processing a sales return. The system may initiate a sales return transaction prior to a customer being physically present at a merchant store. To this extent, the system is also capable of transmitting sales return information to a merchant such that the consumer's presence is not necessary in order to process a sales return transaction. Merchants and Consumers may use QR codes to both process payments for sales transactions and initiate sales return transactions.

31 Claims, 7 Drawing Sheets

(56) References Cited

U.S. PATENT DOCUMENTS

| | | |
|---|---|---|
| 2008/0197192 A1 | 8/2008 | Lindahl et al. |
| 2009/0271265 A1* | 10/2009 | Lay et al. .................. 705/14.38 |
| 2010/0010918 A1* | 1/2010 | Hunt .............................. 705/27 |
| 2011/0218884 A1 | 9/2011 | Kothari et al. |
| 2012/0080517 A1 | 4/2012 | Braunstein |

* cited by examiner

SYSTEM FOR PRE-PROCESSING SALES RETURNS

FIELD

In general, embodiments herein disclosed relate to computing networks and, more specifically, systems, methods, and computer program products for pre-processing sales returns.

BACKGROUND

Traditionally, merchant return processes can be difficult to navigate for the consumer. Inasmuch, the process can even deter some consumers from returning products. Consumers must usually spend time to drive to a merchant, wait in line, and attempt to locate new comparable products to substitute for the return. Inasmuch, the consumer may find that in many instances the present return process is not worth the inconvenience. To this extent, a need exist for a system that increases the efficiency of the sales return process on the merchant end. A system as such may pre-process sales returns prior to the consumer arriving at the merchant store or without the need for a consumer to be physically present in order to return a product. In this way, many of the issues associated with sales returns may be removed, thus increasing customer satisfaction.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

Methods, systems and computer program products are defined that provide for pre-processing sales returns. A system and method provide for embodiments of the claimed invention. The system includes a non-transitory computer-readable storage medium including computer-readable program code, and a processor coupled to the computer readable storage medium and configured to execute the computer readable program code. In accordance with embodiments herein disclosed, the system may process a sales transaction, wherein the sales transaction comprises the exchange of one or more products between a merchant and a consumer. The system may then initiate a sales return transaction, wherein the sales return transaction may be associated with the return of one or more products to the merchant. The system may periodically transmit sales return information from the consumer to the merchant. The system may also process a sales return transaction.

According to one embodiment of the invention, the system may present a payment code to the consumer, wherein the payment code may be associated with the sales transaction such that when the payment code is received by the consumer, via a user device, the consumer is presented with an option to select a method of payment for the sales transaction. In such an embodiment the payment code may be a QR code. The payment code may be presented via a point-of-sale device terminal.

According to one embodiment of the invention, the system may receive consumer payment information. The payment information may be associated with the method of payment selected by the consumer. As such the merchant may receive a payment for the sales transaction based at least partially on the consumer payment information. The merchant may also issue an electronic sales receipt such that the electronic sales receipt is associated with the sales transaction.

According to one embodiment of the invention, the system may present a return code such that when the return code is received, via a user device, a sales return process initiated. In one embodiment, the return code may be a QR code. In such an embodiment, the return code may be presented via a point-of-sale device terminal. The merchant may receive return information associated with a sales return transaction. In one embodiment, return information is received for one or more products being returned According to one embodiment of the invention, the system may detect the consumer entered a merchant area. The system may also send information to a product manufacturer. In one embodiment, the information is associated with a product being returned. The merchant may provide an offer to the consumer. In one embodiment, the offer is associated with the sales return transaction. The merchant may also issue an electronic sales return receipt. In one embodiment, the electronic sales return receipt is associated with the sales return transaction.

A further embodiment of invention is defined by a computer program product that includes a computer-readable medium. The computer-readable medium includes a first program code portion operable to cause a computer to process a sales transaction. The sales transaction may comprise the purchase of one or more products between a merchant and a consumer. The computer-readable medium additionally includes a second program code portion operable to cause a computer to initiate a sales return transaction. The sales return transaction may be associated with the return of one or more products to the merchant. The computer-readable medium additionally includes a third program code portion operable to cause a computer to transmit sales return information from the consumer to the merchant. The computer-readable medium additionally includes a fourth program code portion operable to cause a computer to process the sales return transaction.

In further optional embodiments of the invention, the first set of codes are further operable for causing a computer to present a payment code to the consumer. The payment code may be associated with the sales transaction such that when the payment code is received by the consumer, via a user device, the consumer is presented with an option to select a method of payment for the sales transaction.

In further optional embodiments of the invention, the first set of codes are further operable for causing a computer to receive consumer payment information. The payment information may be associated with the method of payment selected by the consumer. The first set of codes may be further operable for causing a computer to receive a payment for the sales transaction based at least partially on the consumer payment information. The first set of codes may be further operable for causing a computer to issue an electronic sales receipt. The electronic sales receipt may be associated with the sales transaction.

In further optional embodiments of the invention, second set of codes may be further operable for causing a computer to present a return code such that when the return code is received, via a user device, a sales return process initiated.

In further optional embodiments of the invention, the third set of codes may be further operable for causing a computer to receive return information associated with a sales return transaction. The return information may be received for one or more products being returned. The third set of codes may be further operable for causing a computer to detect the consumer entered a merchant area. The third set of codes may be further operable for causing a computer to provide an offer to the consumer, wherein the offer is associated with the sales return transaction.

In further optional embodiments of the invention, the fourth set of codes may be further operable for causing a computer to send information to a product manufacturer. The information may be associated with the product being returned. The fourth set of codes may be further operable for causing a computer to issue an electronic sales return receipt. The electronic sales return receipt may be associated with the sales return transaction.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
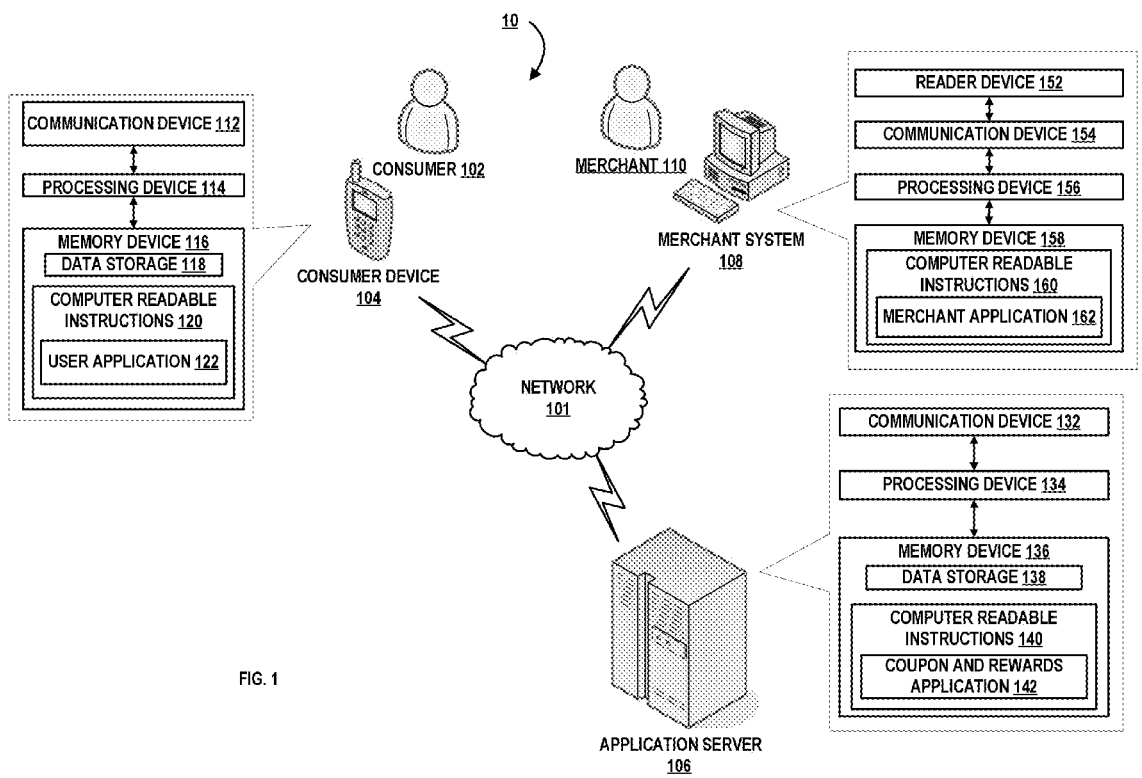
Figure 2:
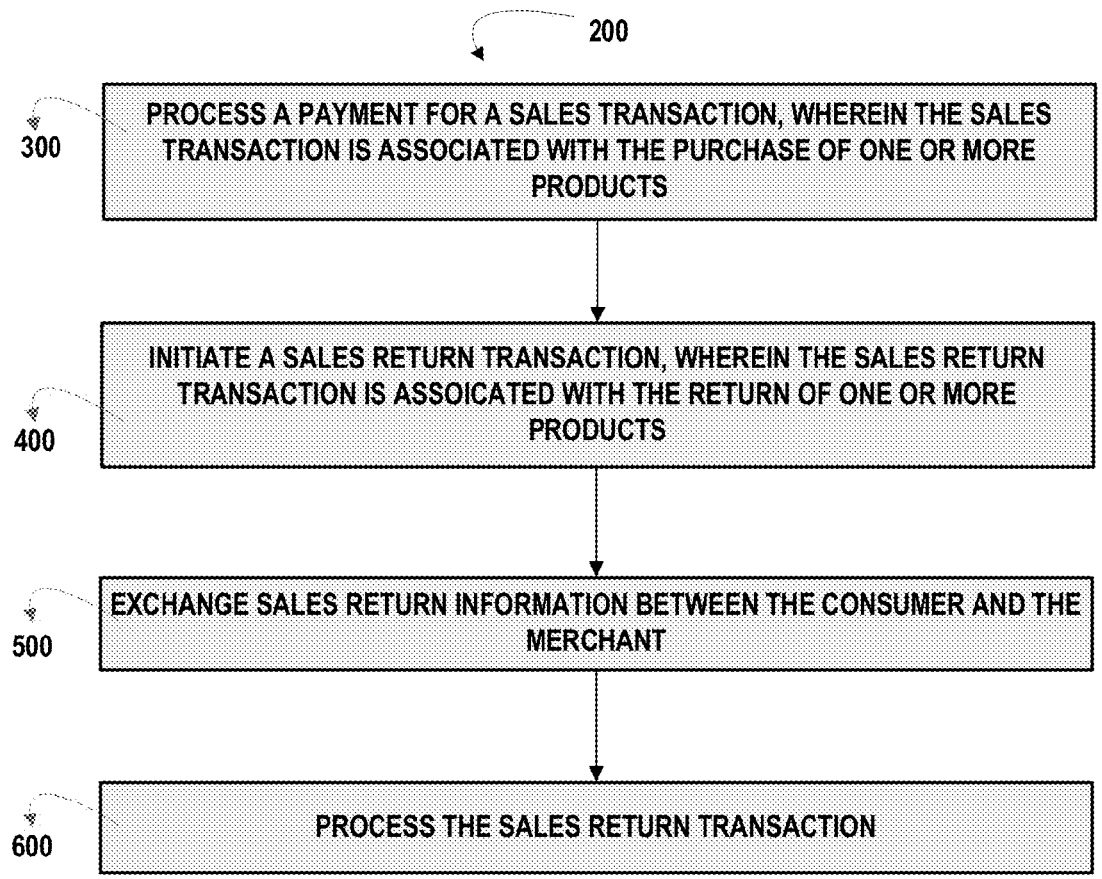
Figure 3:
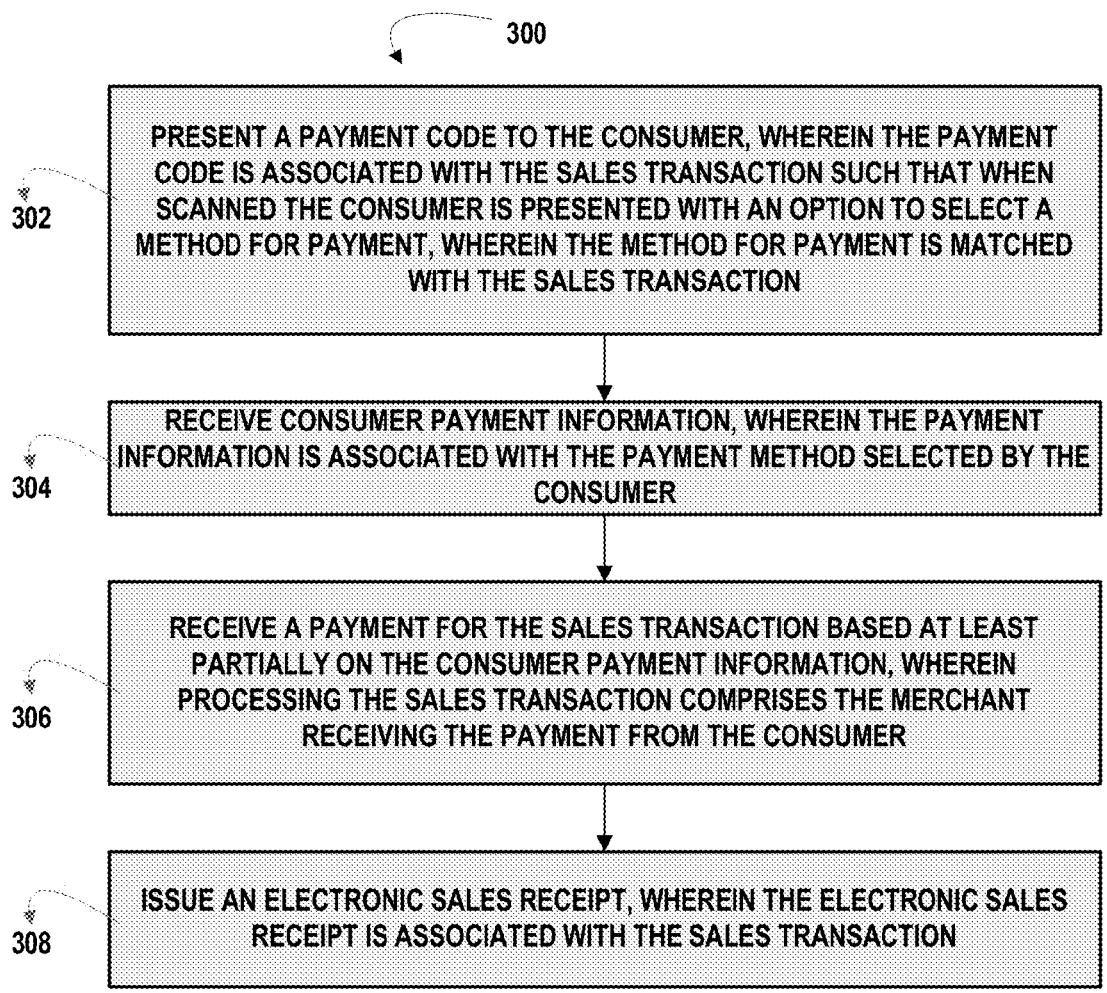
Figure 4:
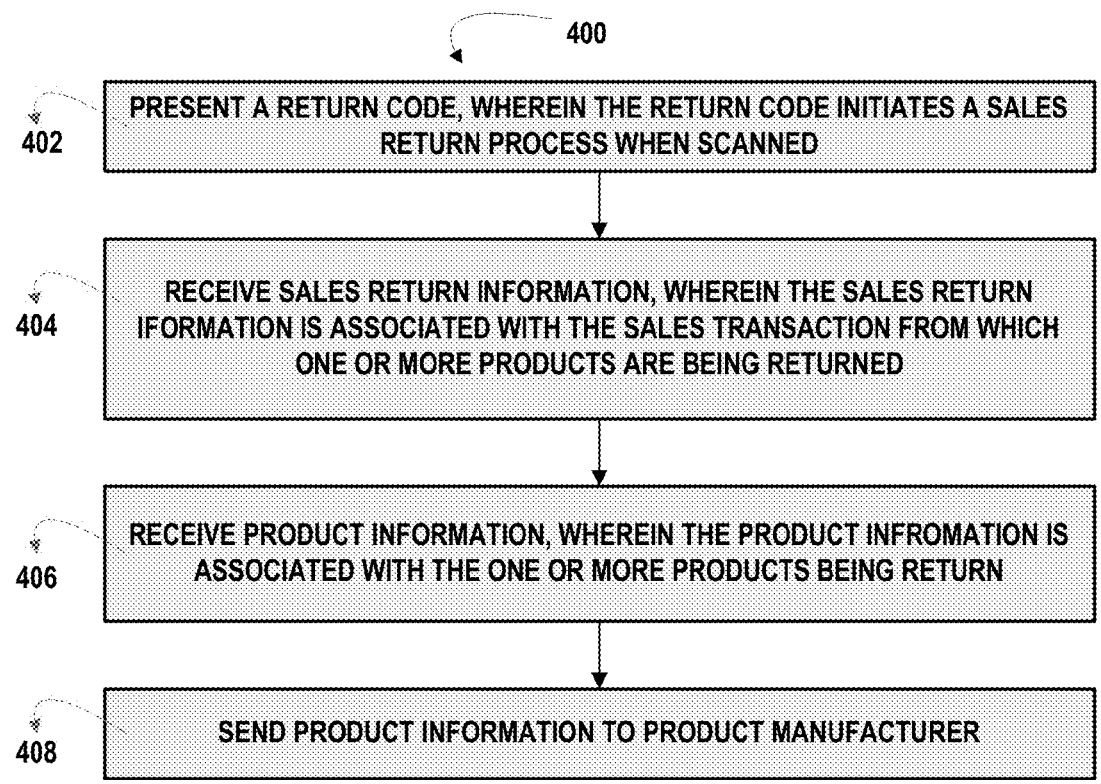
Figure 5:
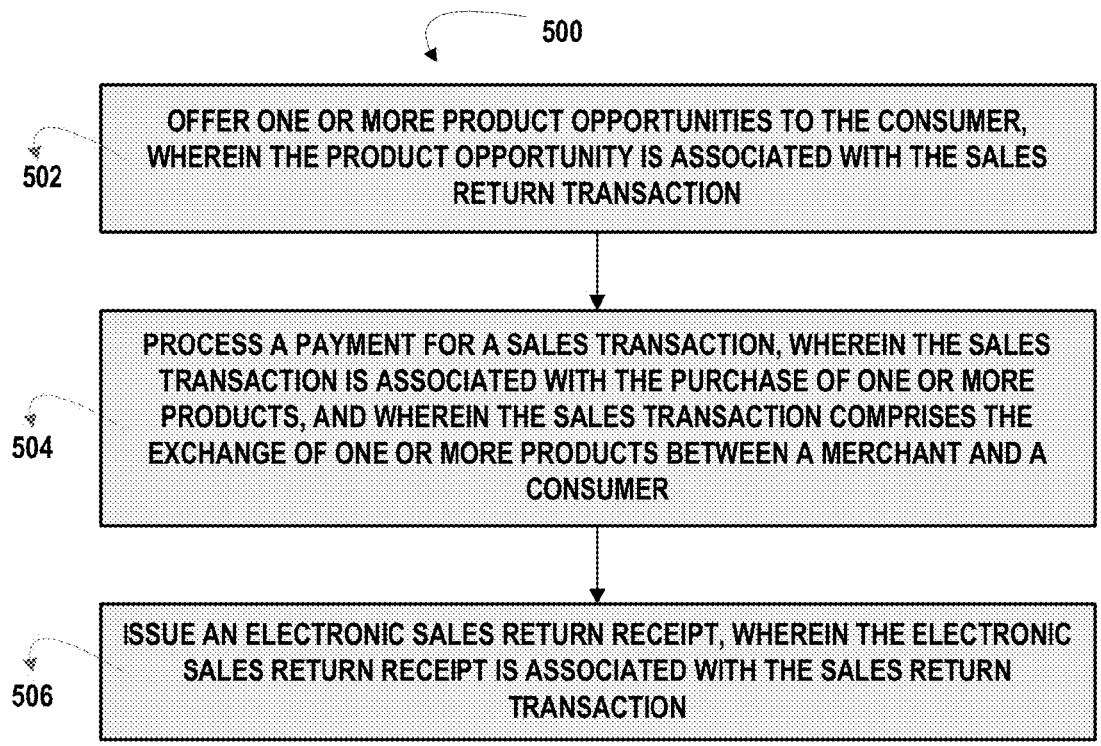
Figure 6:
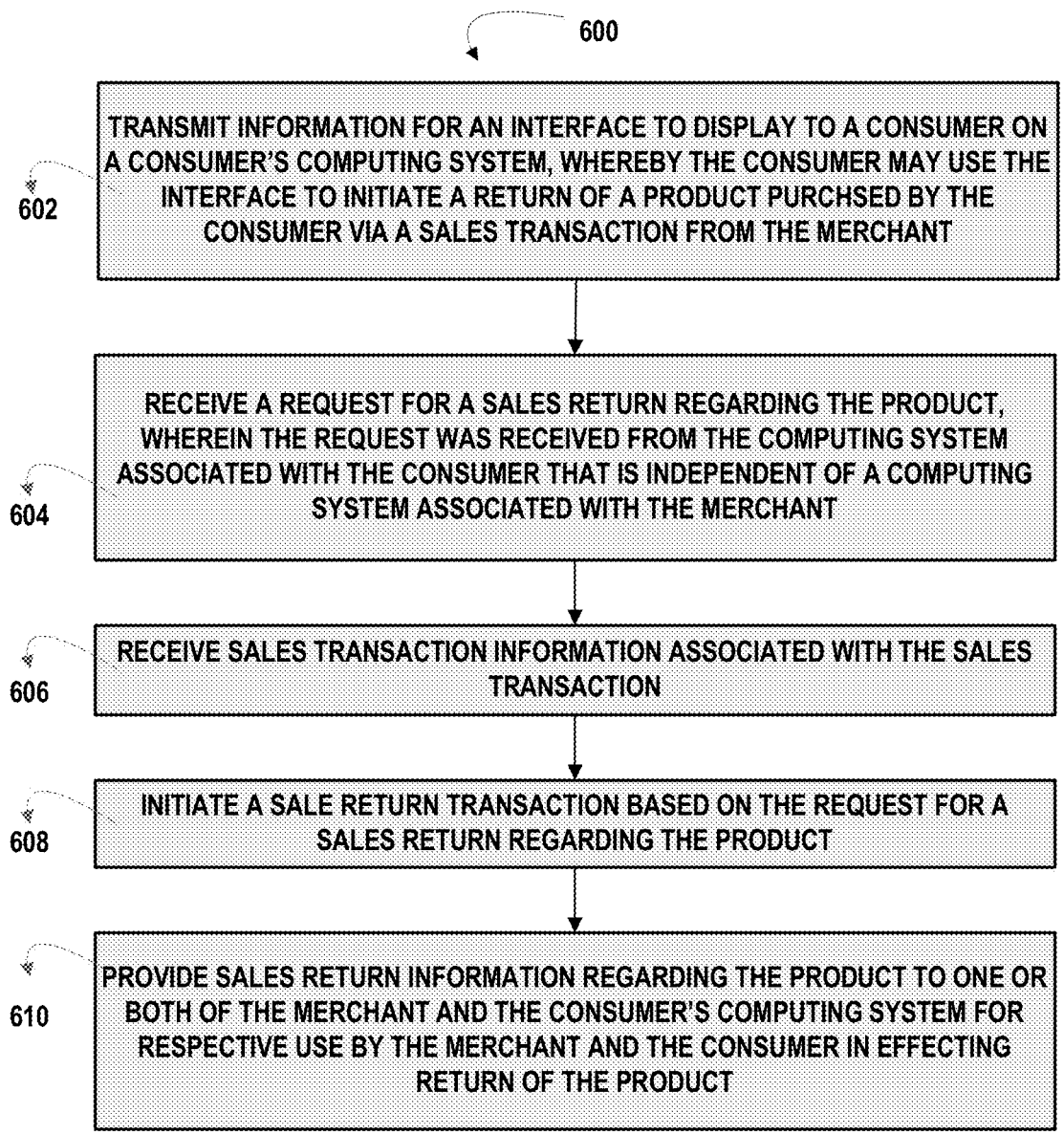
Figure 7:
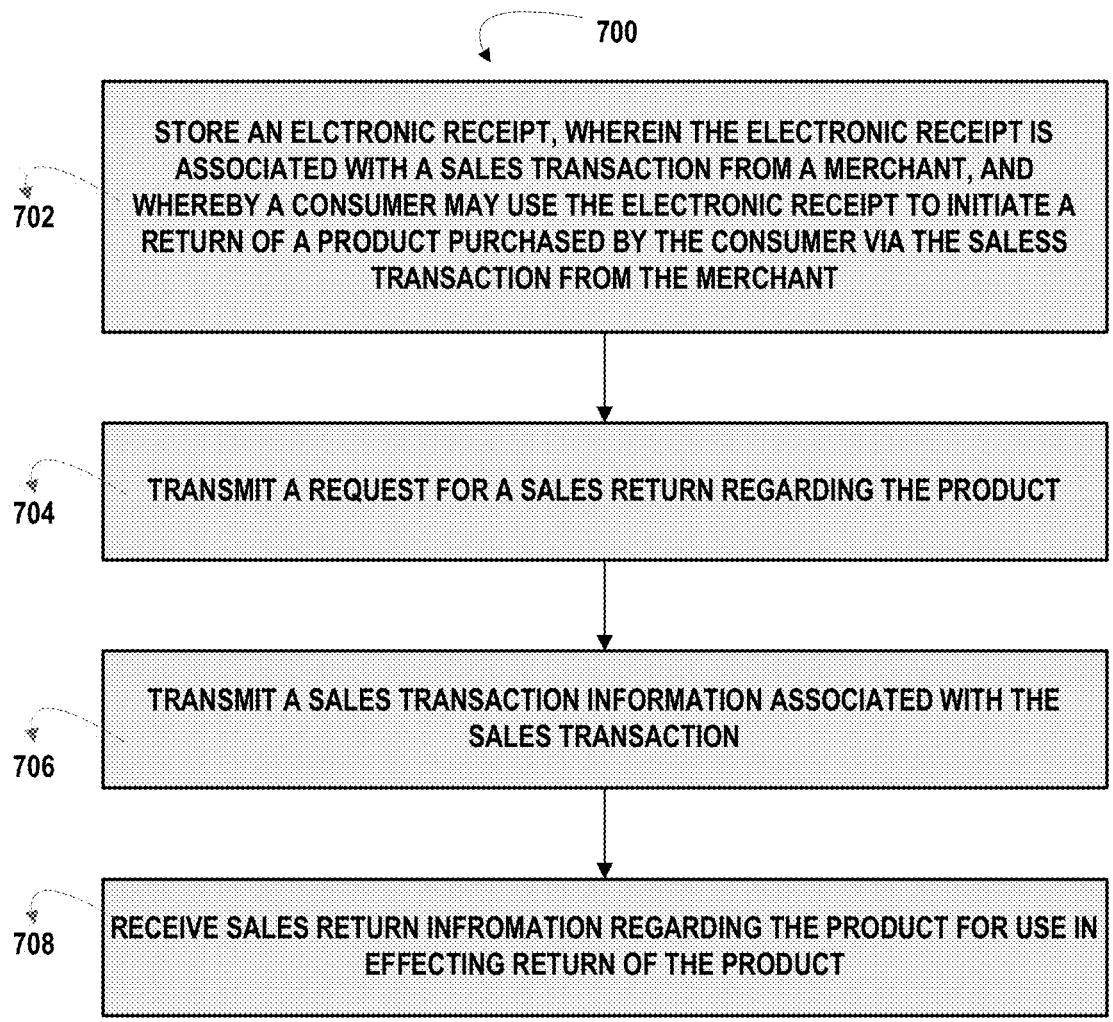

Having thus described embodiments of the invention in general terms, reference will now be made to the accompanying drawings, which are not necessarily drawn to scale, and wherein:

FIG. 1 is a block diagram illustrating a system for pre-processing sales returns, according to an embodiment of the present invention;

FIG. 2 is a flowchart illustrating a method for pre-processing sales returns, according to an embodiment of the present invention;

FIG. 3 is a flow chart illustrating a method for processing a payment for a sales transaction, in accordance with embodiments of the present invention;

FIG. 4 is a flowchart illustrating a method for initiating a sales return transaction, in accordance with an embodiment of the present invention;

FIG. 5 is a flowchart illustrating a method for processing a sales return transaction, in accordance with an embodiment of the present invention;

FIG. 6 is a flowchart illustrating a method for pre-processing sales returns, according to an embodiment of the present invention;

FIG. 7 is a flowchart illustrating a method for pre-processing sales returns, according to an embodiment of the present invention;

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout. Where possible, any terms expressed in the singular form herein are meant to also include the plural form and vice versa, unless explicitly stated otherwise. As used herein a "consumer" refers to a previous consumer or a non-consumer of one or more merchants or entities associated with one or more merchants. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

Furthermore, as used herein, the term "product" shall mean one or more goods, services, events, etc. that may be offered by a merchant. In addition, the term "offer" is used herein to denote any form of offer, promotion, rebate, coupon, incentive, reward, deal, loyalty program and/or the like offered for the purchase, lease, and/or the like of a product. A "coupon" as used herein may refer to a deal and/or the like of a product. A "transaction" as used herein may refer to a purchase, lease, barter, and/or any other form of transfer of product from a merchant to a consumer. A "merchant" as used herein may refer to a manufacturer, retailer, service provider, event provider, warehouse, supplier, and/or the like.

Various embodiments or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Embodiments of the present invention are described below with reference to flowchart illustrations and/or block diagrams of methods, apparatus (systems), and computer program products. It may be understood that each block of the flowchart illustrations and/or block diagrams, and/or combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create mechanisms for implementing the functions/acts specified in the flowchart and/or block diagram block or blocks.

The steps and/or actions of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some embodiments, the processor and the storage medium may reside in an Application Specific Integrated Circuit (ASIC). In the alternative, the processor and the storage medium may reside as discrete components in a computing device. Additionally, in some embodiments, the events and/or actions of a method or algorithm may reside as one or any combination or set of codes and/or instructions on a machine-readable medium and/or computer-readable medium, which may be incorporated into a computer program product.

In one or more embodiments, the functions described may be implemented in hardware, software, firmware, or any combination thereof If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures, and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc", as used herein, include compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

Thus, methods, systems, computer programs and the like are herein disclosed that provide for a pre-processing sales returns.

While the foregoing disclosure discusses illustrative embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any embodiment may be utilized with all or a portion of any other embodiment, unless stated otherwise.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

FIG. 1 provides a system environment for pre-processing sales returns 10, in accordance with one embodiment of the present invention. As illustrated in FIG. 1, the application server 106 is operatively coupled, via a network 101 to the consumer device 104, and to the merchant system 108. It should be noted that merchant systems could include both a merchant account interface as well as a merchant end system, such as a cash register. It should also be noted that the terms "merchant system" and "merchant computing system" may be used interchangeably throughout the specification. It should be further noted that the terms "consumer device" and "consumer computing system" may be used interchangeably throughout the specification. In specific embodiments, the merchant system 108 may be a point-of-sale device. It should also be noted, in some embodiments the consumer device 104 may be interchanged with other end consumer systems, such as a computer. In this way, the application server 106 can send information to and receive information from the consumer device 104 and the merchant system 108 to process sales transactions and sales return transactions. In one embodiment, the application server 106 can send information to and receive information from a plurality of merchant systems 108. As such, the application server may function as a central third-party application server for pre-processing returns. For example, a shopping center may have a return desk and/or return kiosk capable of processing returns, via the application server 106, for any merchant within the shopping center. FIG. 1 illustrates only one example of an embodiment of a system environment 10, and it will be appreciated that in other embodiments one or more of the systems, devices, or servers may be combined into a single system, device, or server, or be made up of multiple systems, devices, or servers.

The network 101 may be a global area network (GAN), such as the Internet, a wide area network (WAN), a local area network (LAN), or any other type of network or combination of networks. The network 101 may provide for wireline, wireless, or a combination wireline and wireless communication between devices on the network.

In some embodiments, the consumer 102 is an individual making a transaction. The transaction may be made at a merchant system 108 of a merchant, online or offline, over the phone, at the merchant's place of business and/or other transaction means. The purchase may be made by the consumer 102 using a consumer device 104, such as a mobile wallet (i.e. smart phone, PDA, etc.) or other types of payment systems that communicate with merchant systems 108 and/or application servers 106 to allow the merchant 110 to process a transaction. In other embodiments, the consumer 102 may make transactions using a card with stored magnetic information, digital information, or other like payment device that stores information that may be transferred to a merchant system 108 and/or a application server 106 to allow a consumer 102 to make a transaction, such as a credit card, debit card, gift card, and/or the like. In some embodiments, the merchant 110 may be a merchant or a person, employee, agent, independent contractor, etc. acting on behalf of the merchant to enter process a transaction.

As illustrated in FIG. 6, the application server 106 generally comprises a communication device 132, a processing device 134, and a memory device 136. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 134 is operatively coupled to the communication device 132 and the memory device 136. The processing device 134 uses the communication device 132 to communicate with the network 101 and other devices on the network 101, such as, but not limited to the merchant system 108 and the consumer device 104. As such, the communication device 132 generally comprises a modem, server, or other device for communicating with other devices on the network 101.

As further illustrated in FIG. 1, the application server 106 comprises computer-readable instructions 140 stored in the memory device 136, which in one embodiment includes the computer-readable instructions 140 of an application 142. In some embodiments, the memory device 136 includes data storage 138 for storing data related to sales transactions and/or sales return transactions including but not limited to data created and/or used by the application 142 or the payment information of consumers 102. The data storage 138 may also store all electronic receipts, product information, payment codes, and/or return codes related to sales transactions and/or sales return transactions.

In the embodiment illustrated in FIG. 1 and described throughout much of this specification, the sales return application 142 allows the consumer 102 to interact with the system. First, sales return application 142 allows a consumer 102 to select a method for payment, via the consumer device 104. Next, the application 142 allows the merchant 110 to receive the consumer's 610 payment information related to a sales transaction, via the merchant system 108. Both sending and receiving payment information to be associated with a particular sales transaction may be performed by a using an interface, such as a consumer device 104 or merchant system 108, provided from the application 142 via a network 101.

In some embodiments, the sales return application 142 allows the consumer 102 to communicate, via the consumer device 104, to indicate products that the consumer 102 may wish to return. This communication may be in the form of text communications, voice communications, or the like. Typically, offers associated with products the consumer 102 may wish to return may be provided by the merchant 110 through an interface on the consumer device 104 or via the merchant system 108. The sales return application 142 may receive the product information related to a sales return transaction via the merchant system 108 once the consumer 610 has provided the sales return information.

The offers provided through the system for pre-processing sales returns may be associated with the sales return transaction such that the offer is more beneficial to a consumer 102 than other general offers provided by the merchant. This is largely due to the unique position of the merchant 110 with respect to the consumer 102. In this way, the offers may entice the consumer 102 to purchase a similar products related to the product being returned. In a specific embodiment, the product may be offered at a discount price. These discounted products may be passed on to the consumers 102 of the sales return transaction. Thus, the offers provided in response to a sales return transaction may comprise special offers that are exclusively provided to the consumer 102 from the merchant 110. In this way, the consumer 102 may receive more beneficial offers.

The merchant 110, through the merchant system 108 may provide the sales return application 142 data with respect to the offers available. The sales return application 142 may then store the data related to the merchant 110 offer such as, but not limited to the product, the offer, the location for the offer, etc. In this way, the sales return application 142 may have access to all offers available from all merchants 110, in a database, to utilize to match the consumer 102 with one or more offers. In an instance that similar products are being returned the sales return application 142 can offer similar offers to consumers 102. In one embodiment, the sales return application 142 may detect a favorable acceptance of a particular offer amongst consumers and be more likely to provide that offer when the associated product is returned.

The sales return application 142 may also receive data from the merchant system 108. The merchant system 108, as explained in further detail below, allows the sales return application 142 to determine the location of the merchant 110. Because the merchant system 108 may send authentication for a consumer 102 sales return transaction to the application server 106, the sales return application 142 may receive data regarding the transaction from the application server 106. In this way, the sales return application 142 may determine and store in the data storage 138 information relating to the location of the consumer 102 and the products of the sales return transaction. The location of the merchant 110 may be determined due to the merchant system location or other means such as global positioning systems (GPS), consumer device 104 locators, or the like. In some embodiments, the location data is determined by a merchant system 108. In this way the location data may be analyzed to verify the consumer 102 is within the specific area required to process a sales return transaction. In this way, the location data provided by the merchant system 108 or the consumer device 104 to the sales return transaction application 142 may aid in providing the consumer 102 a rapid checkout during their sales return transaction. In one embodiment, the consumer 102 may use an application to detect their location in reference to the merchant area for a pre-determined period of time. As such, the location information may be sent to the merchant system 108 during the pre-determined period to anticipate the arrival of the consumer 102 to the merchant area. The application may be a third-party application.

In some embodiments, the location data is determined by GPS data of the consumers 102 consumer device 104 or other means not associated with the merchant system 108. In this way, the consumer 102 may not be within a merchant area, but instead at home, work, etc. The location data may provide an indication of merchant areas within a specific range from the consumers 102 location, such that the system may retrieve a product related to the sales return transaction when the consumer is within a predetermined distance of the merchant area. In some embodiments the system may access previously stored GPS data to provide offers to the customers from merchants in areas that the consumer 102 frequently visits.

The data stored within the sales return application 142 provides computer readable instructions 140 to the processing device 134 to allow for the matching of an offer received from a merchant system 108 with a consumer 102 based on the sales return information, transaction information, product information and the like. The sales return application 142 stores successful offers and communicates the offers to a consumer 102 via a network 101 to the consumer 102 via consumer device 104.

Matching offers provided by merchants with consumers 102 may require an analysis of the consumers 102 location, transactions, and/or purchase history. The sales return application 142 may provide an offer to a consumer 102 based on one of these factors, all of these factors or a combination of the factors. The sales return application 142 uses these factors to determine which offers from merchants, the offers stored in a database in data storage 138, are appropriate offers for the consumer 102. In some embodiments, the offer may be for products that it may be determined that the consumer 102 may be interested in.

As illustrated in FIG. 1, the merchant system 108 generally comprises a reading device 152, a communication device 154, a processing device 156, and a memory device 158. The reading device 152 is operatively coupled to the processing device 156, communication device 154, and the memory device 158. The merchant system 108 may include a reader device 152 to receive payment account information from the consumer 102 through the consumer device 104 and/or other payment devices. Such a reader device 152 may include a magnetic strip reader, a barcode scanner, a radio frequency (RF) reader, a character recognition device, a magnetic ink reader, a processor for interpreting codes presented over an electrical or optical medium, a biometric reader, a wireless receiving device, and/or the like. In some embodiments, the reading device 152 receives information that may be used to identify the consumer's 102 payment account and/or transaction data at the merchant system 108 and communicates the information via the communication device 154 over a network 101, to other systems such as, but not limited to the application server 106, other systems, and/or the commercial partner system. As such, the communication device 154 generally comprises a modem, server, or other device for communicating with other devices on the network 101.

As further illustrated in FIG. 1, the merchant system 108 comprises computer-readable instructions 160 stored in the memory device 158, which in one embodiment includes the computer-readable instructions 160 of a merchant application 162. A merchant system 108 may refer to any device used to perform a transaction, either from the consumer's perspective, the merchant's perspective or both. In some embodiments, the merchant system 108 may refer only to a consumer's device, in other embodiments it refers only to a merchant device, and in yet other embodiments, it refers to both a consumer device and a merchant device interacting to perform a transaction. For example, in one embodiment, the merchant system 108 refers to the consumer's mobile device configured to communicate with a merchant's point of sale terminal, whereas in other embodiments, the merchant system 108 refers to the merchant's point of sale terminal configured to communicate with a consumer's mobile device, and in yet other embodiments, the merchant system 108 refers to both the consumer's mobile device and the merchant's point of sale terminal configured to communicate with each other to carry out a transaction. In one embodiment, the merchant system 108 may be a self-service kiosk or special merchant terminal for processing returns. As such the consumer 102 may avoid the traditional customer service/return desk when processing returns and complete the preprocessed return with the self-service kiosk.

In some embodiments, a merchant system 108 is or includes an interactive computer terminal that is configured to initiate, perform, complete, and/or facilitate one or more transactions. A merchant system 108 could be or include any device that a consumer may use to perform a transaction with an entity, such as, but not limited to, a digital sign, a magnetic-based payment device (e.g., a credit card, debit card, etc.), a personal identification number (PIN) payment device, a contactless payment device (e.g., a key fob), a radio frequency identification device (RFID) and the like, a computer, (e.g., a personal computer, tablet computer, desktop computer, server, laptop, etc.), a mobile device (e.g., a smartphone, cellular phone, personal digital assistant (PDA) device, MP3 device, personal GPS device, etc.), a merchant terminal, a self-service machine (e.g., vending machine, self-checkout machine, etc.), a public and/or business kiosk (e.g., an Internet kiosk, ticketing kiosk, bill pay kiosk, etc.), a gaming device, and/or various combinations of the foregoing.

In some embodiments, a merchant system 108 is operated in a public place (e.g., on a street corner, at the doorstep of a private residence, in an open market, at a public rest stop, etc.). In other embodiments, the point-of-sale device is additionally or alternatively operated in a place of business (e.g., in a retail store, post office, banking center, grocery store, factory floor, etc.). In accordance with some embodiments, the merchant system 108 is not owned by the consumer of the merchant system 108. Rather, in some embodiments, the merchant system 108 is owned by a mobile business operator or a POS operator (e.g., merchant, vendor, salesperson, etc.). In yet other embodiments, the merchant system 108 is owned by the offering the Merchant system 108 providing functionality in accordance with embodiments of the invention described herein.

In the embodiment illustrated in FIG. 1, the merchant application 162 allows the merchant system 108 to be linked to the application server 106 to communicate, via a network 101, the information related to the transaction being made, such as the transaction type, cost of transaction, product type, merchant location, consumer 102 location, etc. In this way, the merchant application 162 may provide the sales return application 142 with location data and sales return information, such that the sales return application 142 may determine an appropriate time to retrieve products related to the sales return transaction.

The merchant application 162 may also receive information from the application server 106. The merchant application 162, in some embodiments, may receive an offer or offers from the sales return application 142, such that they merchant application 162 may display the offer or offers to the consumer 102 on a display on the merchant system 108. In this way, the consumer 102 may receive an offer to purchase an upgraded version of the product that the consumer 102 is already in the process of returning. The offer may be displayed on the merchant system 108 such that the consumer 102 may accept the offer prior to the completion of the transaction.

FIG. 1 also illustrates a consumer device 104. The consumer device 104 generally comprises a reader device 111, communication device 112, a processing device 114, and a memory device 116. The processing device 114 is operatively coupled to the communication device 112 and the memory device 116. The processing device 114 uses the communication device 112 to communicate with the network 101 and other devices on the network 101, such as, but not limited to the merchant system 108, the application server 106. As such, the communication device 112 generally comprises a modem, server, or other device for communicating with other devices on the network 101.

The consumer device 104 may include a reader device 152 to select payment account information from the sales transaction through the consumer device 104 and/or other payment devices. Such a reader device 152 may include a magnetic strip reader, a barcode scanner, a radio frequency (RF) reader, a character recognition device, a magnetic ink reader, a processor for interpreting codes presented over an electrical or optical medium, a biometric reader, a wireless receiving device, and/or the like. In some embodiments, the reading device 152 receives information that may be used to identify the consumer's 102 payment account's and/or sales transaction data at the merchant system 108 and communicates the information via the communication device 154 over a network 101, to other systems such as, but not limited to the application server 106, other systems, and/or the commercial partner system. As such, the communication device 154 generally comprises a modem, server, or other device for communicating with other devices on the network 101.

As further illustrated in FIG. 1, the consumer device 104 comprises computer-readable instructions 120 stored in the memory device 116, which in one embodiment includes the computer-readable instructions 120 of a consumer application 122. A "mobile device" 104 may be any mobile communication device, such as a cellular telecommunications device (i.e., a cell phone or mobile phone), personal digital assistant (PDA), a mobile Internet accessing device, or other mobile device including, but not limited to portable digital assistants (PDAs), pagers, mobile televisions, gaming devices, laptop computers, cameras, video recorders, audio/video player, radio, GPS devices, any combination of the aforementioned, or the like. Although only a single consumer device 104 is depicted in FIG. 6, the system environment 10 may contain numerous mobile devices 104.

Referring now to FIG. 2, a flowchart illustrates a method 200 for pre-processing sales returns according to embodiments of the invention. As represented by block 300, the consumer 102 purchases one or more products from the merchant 110 such that a sales transaction occurs. To this extent, a payment may be processed on behalf of the consumer 102 to the merchant 110. In one embodiment, the payment may be processed using a mobile payment option. The mobile payment option may send the consumer's 102 payment information to the merchant 110 via network 101 such that the payment is processed using the merchant system 108. As represented by block 400, in some instances the consumer 102 may be dissatisfied with their purchase from the merchant 110 such that they may wish to return the purchased products. In this way, a sales return transaction may be initiated such that the sales return transaction is associated with the return of one or more products by the consumer to the merchant. As represented by block 500, prior to processing a sales return transaction the merchant must first receive sales return information associated with the sales return transaction such that the sales return information may be transmitted from the consumer 102 to the merchant 110. Upon receiving sales return information, as represented by block 600, the sales return transaction may be processed.

Referring now to FIG. 3, a flowchart illustrates a method for processing a payment for a sales transaction according to embodiments of the invention. At event 302, the consumer is first presented a payment code. The payment code may be associated with particular sales transaction. The payment code may include, but not be limited to a QR code, barcode, watermark, alphanumeric code and the like. The payment code may be read by the consumers 102 consumer device 104 using the reading device 111. After reading the payment code the consumer 102 may be presented with an option to select a method of payment for processing the sales transaction associated with the payment code. The options may be displayed on a graphical user interface of the consumer device 104 via the user application 122. In one embodiment, the method of payment may be one or more credit and/or debit accounts of the consumer 102. In another embodiment, the method of payment may be a store credit and/or gift card the consumer 102 received on behalf of the merchant 110.

At event 304, the merchant 110 receives payment information from the consumer 102. The payment information is associated with the method of payment selected by the user. In one embodiment, the payment information may be transmitted directly from the consumers 102 consumer device 104 to the merchant system 108 via the network 101. In this way, the payment information may be matched with the sales transaction upon being received at the merchant system 108. In another embodiment, the payment information may be transmitted to the application server 106. Likewise, information related to the sales transaction may be transmitted by the merchant to the application server 106. In this way, the payment information may be matched with the sales transaction using the application server 106 and sent to the merchant system 108 via the application server 106. The payment information may be stored locally on the consumer device 104. In this way, the payment information is not susceptible for misappropriation of identity. The payment information may also be stored remotely on an encrypted application server 106.

At event 306, the sales transaction is processed based at least partially on the payment information selected by the consumer 102. The transaction is processed such that the merchant 110 receives a payment from the consumer 102 associated with the sales transaction. The payment may be processed using any device capable of receiving payment information. In one embodiment, the payment information may be received by the merchant system 108 such that the merchant system 108 processes the payment using the payment information. In another embodiment, the payment information may be received by the application server 106 such that the application server 106 processes the payment using the payment information.

At event 308, an electronic sales receipt is issued by the merchant 110 to the consumer 106. The electronic sales receipt may display information relevant to the sales transaction. The electronic sales receipt may display information such as merchant name, merchant address, merchant telephone number, product name(s), product quantity, transaction date, transaction number, transaction amount(s), payment information, consumer signature and the like. The electronic sales receipt may also display a payment code associated with the sales transaction and/or a return code associated with the sales transaction. In one embodiment, the payment code and the return code may be the same code.

Referring now to FIG. 4, a flowchart illustrates a method for processing a payment for a initiating a sales return transaction according to embodiments of the invention. At event 402, a return code is presented. The return code may be associated with particular sales return transaction. The return code may include, but not be limited to a QR code, barcode, watermark, alphanumeric code and the like. The return code may be presented by either the merchant 110 or the consumer 102. The return code may also be located on a product associated with the sales transaction. In one embodiment, the return code and the product barcode may be the same. The return code may be read by the consumers 102 consumer device 104 using the reader device 111. The return code may also be read by the merchants 110 merchant system 108 using the reader device 152. The return code may be displayed on a graphical user interface of the consumer device 104 via the user application 122. The return code may also be displayed using the merchants 110 merchant system 108. In one embodiment, the return code may be displayed via a point of sale device. In another embodiment, the return code may be displayed via the merchants 110 website. In yet another embodiment, the return code may be displayed on an electronic sales receipt.

At event 404, sales return information associated with the sales return transaction is transmitted and received by the merchant 110. The sales return transaction may comprise one or more products being returned by the consumer 102. After reading the return code the consumer 102 may be presented with an option to select a sales transaction for which the consumer 102 wishes to return. The sales transaction may be selected from a list of sales transactions displayed on the consumers 102 consumer device 104 and populated in response to the consumer reading the return code. In one embodiment, displaying a sales transaction may comprise displaying the electronic receipt associated with the sales transaction. A plurality of electronic receipts may be stored on the application server 106 for which the consumer 102 may wish to select for a sales return transaction. In one embodiment, every electronic receipt associated with sales transactions for which the consumer processed via a mobile payment option may be located on the application server 106. A plurality of electronic receipts may also be stored locally on the consumers 102 consumer device 104. In another embodiment, every electronic receipt associated with sales transactions for which the consumer processed via a mobile payment option may be located locally on the consumers 102 consumer device 104. After selecting the sales transaction which the consumer 102 wishes to return, the consumer may also select the specific product(s) that the consumer 102 wishes to return. In this way, one or more products may be selected. In one embodiment, the consumer 102 may select to return the entire sales transaction.

As represented by block 404, receiving sales return information may comprise receiving a plurality of information associated with the sales return transaction for which one or more products are being returned. The sales return information may comprise any information related to the sales transaction such as merchant name, merchant address, merchant telephone number, transaction date, transaction number, transaction amount(s), payment information, consumer signature and the like. The sales return information may also comprise the date and time which the product will be returned to the merchant. The sales return information may also comprise the method of return by the consumer 102. For example, in one embodiment, the consumer 102 may return the product(s) directly to the merchant 110 store in-person. In another embodiment, the consumer may return the product(s) to the merchant 110 via mail. As such, in such an embodiment, the method sales return information may comprise the mail carrier, date and time which the product was mailed to the merchant 110. In yet another embodiment, the consumer 102 may elect to have the product(s) returned via pick-up. For example, the consumer 102 may wish to return a product that is not easily mobile via pick-up. As such, the consumer 102 may arrange a time for the merchant to pick up the product and bring a new product for exchange.

As represented by block 406, the sales return information may also comprise product information associated with the one or more products being returned. The product information may comprise any information related to the product(s) being returned such as product name(s), product quantity, product cost(s) and the like. The product information may also comprise the consumers 102 reason for returning the product. In one example, the consumer 102 may return the product due to a product defect. In such an example, the product information may comprise a description by the consumer 102 of the defected product.

Inasmuch, as represented by block 408, the product information may subsequently be sent to the product manufacturer. The product information may be sent to the manufacturer as a notification that the product is being returned. The product information may also be sent to the manufacturer in an attempt to facilitate customer feedback and quality assurance for various products. In one embodiment, the manufacturer may require an return merchandise authorization ("RMA") prior to the merchant 110 returning the product to the manufacturer. In this way, the merchant 110 may receive a pre-approved authorization after sending product information to the product manufacturer. The pre-approved authorization may be contingent upon whether the product was deemed to be faulty by the manufacturer and thus considered a recalled product.

In one embodiment, the system may detect a recalled product on an electronic receipt and queue the product for return such that the return process is initiated. In one embodiment, the system may receive an alert from the product manufacturer the product has been recalled and alert the consumer 102 of the recalled product via email. In another embodiment, the system may receive an alert from the product manufacturer the product has been recalled and alert the consumer 102 of the recalled product via the user application 122. For example, in another embodiment, the system may detect that duplicate purchase of the same product within one sales transaction and queue the product for return such that the return process is initiated. In yet another embodiment the system may detect that a consumer 102 frequently returns product(s) such that the return process is initiated. In such an embodiment, the system may elect to not send the customer product offers in response to the sales return transaction.

Referring now to FIG. 5, a flowchart illustrates a method for processing a sales return transaction in accordance with embodiments of the present invention. At event 502, the merchant 110 may provide one or more product offers to the consumer 102. The product offers may be provided such that they are associated with the sales return transaction and/or the specific product being returned. The product offer may be any offer, promotion, rebate, coupon, incentive, reward, deal, loyalty program and/or the like associated with the sales return transaction. For example, the merchant 110 may provide the consumer 102 an offer to purchase an upgraded version of the product previously purchased. In this way, the upgraded product may contain special features that the consumer 102 listed as a reason for returning the previously purchased product. In another example, the merchant 110 may provide the consumer 102 a percentage discount on their next purchase to encourage the consumer 102 to continue business with the merchant 110 and increase customer loyalty. In one embodiment the system may detect that a consumer 102 frequently returns product(s). In such an embodiment, the system may elect to not send the customer product offers in response to the sales return transaction.

As represented by block 504, a sales return transaction is processed based at least partially on the sales return information received. Processing the sales return transaction may comprise issuing the consumer 102 a refund for the sales transaction. Processing the sales return transaction may also comprise detecting a consumer 102 has entered the merchant area and retrieving a product associated with the sales return transaction for the consumer 102. In this way, the merchant 110 may begin initiating the check-out process prior to the consumer arriving. In one embodiment, the merchant 110 may refer to the date and time of return associated with the sales return information received and may have available for the consumer 102 a plurality of products the consumer 102 may wish to exchange for the product being returned.

As represented by block 506, an electronic sales return receipt is issued by the merchant 110 to the consumer 106. The electronic sales receipt may display information relevant to the sales return transaction. The electronic sales return receipt may display information such as merchant name, merchant address, merchant telephone number, returned product name(s), returned product quantity, transaction return date, transaction return number, transaction return amount(s), returned payment information, consumer signature and the like. The electronic sales receipt may also display a payment code associated with the sales transaction and/or a return code associated with the sales return transaction. In one embodiment, the payment code and the return code may be the same code.

Referring now to FIG. 6, a flowchart illustrates a method for pre-processing sales returns in accordance with embodiments of the present invention. In a preferred embodiment, the referenced method is executed by application server 106. At event 602, information for an interface to display to a consumer on the consumer's computing system 104 is transmitted. In one embodiment, the consumer's computing system 104 may be a mobile device. The consumer 102 may use the interface to initiate the return of a product purchased by the consumer via a sales transaction from the merchant. For example, the application server may transmit an electronic receipt to be stored on the consumer device 104 such that the consumer 102 may later view the electronic receipt via the interface and opt to initiate a return for a product referenced in the electronic receipt. In another embodiment, the application server may transmit a code to be displayed on the consumer's computing system 104 such that the consumer 102 may use the code to initiate a return of a product. At event 604, a request for the sales return of a product is received. In one embodiment, the request may be received from the consumer 102 via the consumer's computing system 104. The consumer's computing system 104 may be a system independent of the merchant's computing system 108. At event 606, the application server 106 may receive sales transaction information associated with the sales transaction. The sales transaction information may comprise the sales transaction date, time, amount, merchant information (e.g. name, location, address, phone number, etc.), product information (e.g. product name's, product costs, product quantity, etc.), consumer information (e.g. method of payment, return history, rewards information, etc.) and the like. At event 608, a sales return transaction is initiated based on the request for a sales return regarding the product. At event 610, the application server provides sales return information regarding the product to one or both of the merchant 110 and the consumer's computing systems for respective use by the merchant and the consumer in effecting the return of the product.

Referring now to FIG. 7, a flowchart illustrates a method for pre-processing sales returns in accordance with embodiments of the present invention. In a preferred embodiment, the referenced method is executed by the consumer device 104. At event 702, the consumer's computing system 104 stores an electronic receipt associated with a sales transaction from a merchant. The consumer may use the electronic receipt to initiate a return of a product purchased by the consumer via the sales transaction from the merchant. At event 704, the consumer 102 may transmit a request for a sales return regarding the product. In one embodiment the request may be transmitted via the consumer's computing system 104. At event 606, the consumer may transmit sales transaction information associated with the sales transaction. The sales transaction information may comprise the sales transaction date, time, amount, merchant information (e.g. name, location, address, phone number, etc.), product information (e.g. product name's, product costs, product quantity, etc.), consumer information (e.g. method of payment, return history, rewards information, etc.) and the like. In one embodiment the sales transaction information may be transmitted via the consumer's computing system 104. At event 708, sales return information regarding a product is received for use in effecting the return of the product. In one embodiment the sales return transaction information may be received via the consumer's computing system 104.

While the foregoing disclosure discusses illustrative embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any embodiment may be utilized with all or a portion of any other embodiment, unless stated otherwise.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system configured for pre-processing sales returns, the system comprising:
   a non-transitory computer-readable storage medium including computer-readable program code stored therein;
   a computer processing device in communication with the computer readable storage medium and configured to execute the computer readable program code to:
   receive a return code associated with a product purchased by a consumer via a sales transaction from a merchant, where the return code was provided to the consumer when the product was initially purchased, and wherein the return code was listed at least on the product or another article associated with the product other than a receipt associated with the product;
   transmit, in response to receiving the return code, an electronic receipt associated with the product purchased by the consumer from the merchant for an interface to display to the consumer on a consumer's computing system, whereby the consumer may use the interface to initiate a sales return of the purchased product;
   receive a request for the sales return regarding the product, wherein the request was received from the consumer's computing system, where the consumer's computing system is independent of a computing system associated with the merchant;
   receive sales transaction information associated with the sales transaction;
   initiate the sales return transaction based on the request for the sales return regarding the product;
   provide sales return information regarding the product to one or both the merchant and the consumer's computing system for respective use by the merchant and consumer in effecting return of the product at a local merchant location associated with the merchant, wherein the product is remotely queued for return by the consumer prior to the consumer's arrival at the local merchant location; and upon arrival of the consumer at the local merchant location, automatically remove the product from a queue and process the sales return transaction.

2. The system of claim 1, wherein receiving a request includes receiving a payment code associated with the sales transaction, and wherein said computer processing device uses the payment code to pre-process the return.

3. The system of claim 2, wherein the payment code is a QR code.

4. The system of claim 2, wherein the payment code comprises a method of payment used by the consumer to perform the purchase, and wherein said computer processing device uses the method of payment information in the payment code to pre-process the return.

5. The system of claim 2, wherein the payment code is associated with product information for the product purchased by the consumer via the sales transaction from the merchant, and wherein said computer processing device uses the product information in the payment code to pre-process the return.

6. The system of claim 1, wherein providing sales return information includes providing the return code associated with the sales return transaction, wherein the return code comprises the sales return information, and wherein the return code is received by one or both the merchant and the consumer's computing system for respective use by the merchant and consumer in effecting return of the product.

7. The system of claim 6, wherein the return code is a barcode.

8. The system of claim 1, wherein said computer processing device is further operable to:
access sales transaction data from a merchant;
detect a duplicate purchase of a product within a sales transaction; and
queue a potential return of one of the duplicate products for use by an inventory system of the merchant.

9. The system of claim 1, wherein the computer processing device is further operable to:
receive information from the consumer regarding a potential issue with the product being returned; and
send the information regarding the potential issue to a manufacturer of the product for use by the manufacturer in processing the return of the product once received.

10. The system of claim 1, wherein the computer processing device is further operable to:
select, based at least partially on the sales transaction information, an offer from one or more offers stored in a database; and
provide the offer to the consumer, wherein the offer is associated with the sales return transaction.

11. The system of claim 10, wherein the offer is a product upgrade, coupon, or rebate.

12. The system of claim 1, wherein both the purchased product and a receipt associated with the purchased product comprise the return code.

13. A computer program product comprising:
a non-transitory computer-readable storage medium comprising:
a first set of codes for causing a computer to receive a return code associated with a product purchased by a consumer via a sales transaction from a merchant, where the return code was provided to the consumer when the product was initially purchased, and wherein the return code was listed at least on the product or another article associated with the product other than a receipt associated with the product;
a second set of codes for causing a computer to transmit, in response to receiving the return code, an electronic receipt associated with the product purchased by the consumer from the merchant for an interface to display to the consumer on a consumer's computing system, whereby the consumer may use the interface to initiate a sales return of the purchased product;
a third set of codes for causing a computer to receive a request for the sales return regarding the product, wherein the request was received from the consumer's computing system, where the consumer's computing system is independent of a computing system associated with the merchant;
a fourth set of codes for causing a computer to receive sales transaction information associated with the sales transaction;
a fifth set of codes for causing a computer to initiate the sales return transaction based on the request for the sales return regarding the product;
a sixth set of codes for causing a computer to provide sales return information regarding the product to one or both the merchant and the consumer's computing system for respective use by the merchant and consumer in effecting return of the product at a local merchant location associated with the merchant, wherein the product is remotely queued for return by the consumer prior to the consumer's arrival at the local merchant location; and
a seventh set of codes for causing a computer to, upon arrival of the consumer at the local merchant location, automatically remove the product from a queue and process the sales return transaction.

14. The computer program product of claim 13, wherein the third set of codes are further operable for causing a computer to present a payment code associated with the sales transaction, and wherein said computer processing device uses the payment code to pre-process the return.

15. The computer program product of claim 13, wherein the sixth set of codes are further operable for causing a computer to provide the return code associated with the sales return transaction, wherein the return code comprises the sales return information, and wherein the return code is received by one or both the merchant and the consumer's computing system for respective use by the merchant and consumer in effecting return of the product.

16. The computer program product of claim 13, the computer program product further comprising an eighth set of codes operable for causing a computer to:
access sales transaction data from a merchant;
detect a duplicate purchase of a product within a sales transaction; and
queue a potential return of one of the duplicate products for use by an inventory system of the merchant.

17. The computer program product of claim 13, the computer program product further comprising an eighth set of codes operable for causing a computer to:
receive information from the consumer regarding a potential issue with the product being returned; and
send the information regarding the potential issue to a manufacturer of the product for use by the manufacturer in processing the return of the product once received.

18. The computer program product of claim 13, the computer program product further comprising an eighth set of codes operable for causing a computer to:
select, based at least partially on the sales transaction information, an offer from one or more offers stored in a database; and provide the offer to the consumer, wherein the offer is associated with the sales return transaction.

19. The computer program product of claim 13, wherein both the purchased product and a receipt associated with the purchased product comprise the return code.

20. A method for pre-processing sales returns, the method comprising:
providing a non-transitory computer-readable storage medium including computer-readable program code stored therein;
providing a computer processing device in communication with the computer readable storage medium and configured to execute the computer readable program code to:
receive a return code associated with a product purchased by a consumer via a sales transaction from a merchant, where the return code was provided to the consumer when the product was initially purchased, and wherein the return code was listed at least on the product or another article associated with the product other than a receipt associated with the product;
transmit, in response to receiving the return code, an electronic receipt associated with the product purchased by the consumer from the merchant for an interface to display to the consumer on a consumer's computing system, whereby the consumer may use the interface to initiate a sales return of the purchased product;
receive a request for the sales return regarding the product, wherein the request was received from the consumer's computing system, where the consumer's computing system is independent of a computing system associated with the merchant;
receive a request for the sales return regarding the product, wherein the request was received from the computing system associated with the consumer that is independent of a computing system associated with the merchant;
receive sales transaction information associated with the sales transaction;
initiate the sales return transaction based on the request for the sales return regarding the product;
provide sales return information regarding the product to one or both the merchant and the consumer's computing system for respective use by the merchant and consumer in effecting return of the product at a local merchant location associated with the merchant, wherein the product is remotely queued for return by the consumer prior to the consumer's arrival at the local merchant location; and
upon arrival of the consumer at the local merchant location, automatically remove the product from a queue and process the sales return transaction.

21. The method of claim 20, wherein receiving a request includes receiving a payment code associated with the sales transaction, and wherein said computer processing device uses the payment code to pre-process the return.

22. The method of claim 21, wherein the payment code is a QR code.

23. The method of claim 21, wherein the payment code comprises a method of payment used by the consumer to perform the purchase, and wherein said computer processing device uses the method of payment information in the payment code to pre-process the return.

24. The method of claim 21, wherein the payment code is associated with product information for the product purchased by the consumer via the sales transaction from the merchant, and wherein said computer processing device uses the product information in the payment code to pre-process the return.

25. The method of claim 20, wherein providing sales return information includes providing the return code associated with the sales return transaction, wherein the return code comprises the sales return information, and wherein the return code is received by one or both the merchant and the consumer's computing system for respective use by the merchant and consumer in effecting return of the product.

26. The method of claim 25, wherein the return code is a QR code.

27. The method of claim 20, wherein said computer processing device is further operable to:
access sales transaction data from a merchant;
detect a duplicate purchase of a product within a sales transaction; and
queue a potential return of one of the duplicate products for use by an inventory system of the merchant.

28. The method of claim 20, wherein the computer processing device is further operable to:
receive information from the consumer regarding a potential issue with the product being returned; and
send the information regarding the potential issue to a manufacturer of the product for use by the manufacturer in processing the return of the product once received.

29. The method of claim 20, wherein the computer processing device is further operable to:
select, based at least partially on the sales transaction information, an offer from one or more offers stored in a database; and
provide the offer to the consumer, wherein the offer is associated with the sales return transaction.

30. The method of claim 29, wherein the offer is a product upgrade, coupon, or rebate.

31. The method of claim 20, wherein both the purchased product and a receipt associated with the purchased product comprise the return code.

* * * * *